United States Patent [19]
Copperthwaite et al.

[11] Patent Number: 4,983,560
[45] Date of Patent: Jan. 8, 1991

[54] MODIFIED ZEOLITE CATALYSTS

[75] Inventors: Richard G. Copperthwaite, Johannesburg; Themistoclis Themistocleous, Braamfontein, both of South Africa; Graham J. Hutchings, North Yorkshire, England

[73] Assignee: Pratley Investments (Proprietary) Limited, Krugersdorp, South Africa

[21] Appl. No.: 242,903

[22] Filed: Sep. 12, 1988

[30] Foreign Application Priority Data

Sep. 11, 1987 [ZA] South Africa ..................... 87/6814

[51] Int. Cl.$^5$ ........................... B01J 37/00; B01J 29/06
[52] U.S. Cl. ......................................... 502/85; 502/60
[58] Field of Search ................................. 502/60, 85

[56] References Cited

U.S. PATENT DOCUMENTS 3,367,884 2/1968 Reid, Jr. ................................. 502/78

FOREIGN PATENT DOCUMENTS 142313 5/1985 European Pat. Off. .............. 502/85

OTHER PUBLICATIONS

Article: "Catalytic Activity and Selectivity of Modified Clinoptilolites for Conversion of Methanol to Light Olefins", Harumi Sakoh et al., pp. 249–253 (1985).

Primary Examiner—Carl F. Dees
Attorney, Agent, or Firm—Cushman, Darby & Cushman

[57] ABSTRACT

There is disclosed a method for the modification of a natural clinoptilolite by acid treatment using a mineral acid at a suitable temperature and for a suitable period of time, followed by calcination, to produce a modified clinoptilolite which may be used as a catalyst in a reaction for the preparation of or transformation of hydrocarbons, e.g. the cracking of hydrocarbon products. There is also disclosed a method of regenerating the deactivated modified catalyst after use by treatment in the presence of nitrous oxide.

8 Claims, 2 Drawing Sheets

MODIFIED ZEOLITE CATALYSTS

BACKGROUND OF THE INVENTION

This invention relates to the modification of a natural zeolite known as clinoptilolite, to the use of the modified clinoptilolite in the preparation and transformation of hydrocarbons, and to the regeneration of the modified clinoptilolite after use.

Synthetic zeolite catalysts such as Zeolite Y have been used for many years in processes for hydrocarbon cracking. Further, in 1973 it was discovered that methanol can be converted to gasoline over a synthetic zeolite catalyst known as ZSM 5. However, ZSM 5 is not the optimum catalyst for the chemical industry because it results in the formation largely of gasoline. The chemical industry would prefer a process, and thus a catalyst for the process, which results in the formation of ethene, propene and butene as these products are more flexible for further use. Further, ZSM 5 is expensive.

Synthetic zeolite catalysts are also of interest for the conversion of natural gases to more useful products. For example, when the gas obtained from a natural gas field is essentially methane, the gas may be steam reformed to form carbon monoxide and hydrogen. Thereafter there are two possible synthesis routes. The carbon monoxide and hydrogen can be subjected to a Fischer Tropsch process which will produce a range of products or the gas can be converted to methanol and then to gasoline utilising a synthetic zeolite catalyst.

In an article in Applied Catalysis, 16 (1985) 249-253 by Sakoh, Nitta and Aomura, it is disclosed that a natural (i.e. naturally occurring) clinoptilolite from Futatsui, Japan, after modification, can be used in the conversion of methanol to light olefins. The modification of the natural clinoptilolite was carried out following two different procedures. The first procedure involved treating the natural clinoptilolite with 1M HCl at 80° C. for 24 hours after which the sample was filtered off, washed with distilled water and dried in air. The second procedure involved impregnating the clinoptilolite with 0.05M and 0.5M $H_2SO_4$, whereafter the samples were filtered off, dried in air and then calcined at 400° C. for 3 hours in air. Thereafter, the catalysts were placed in a fixed bed continuous flow reactor under atmospheric pressure, and methanol vapor was carried through the reactor using helium as a carrier gas. Methanol was converted to hydrocarbons and water at the reaction temperature of 250°-400° C. over all the modified clinoptilolite catalysts. The hydrocarbons produced contained essentially aliphatic hydrocarbons. Further, this article discloses the regeneration of these catalysts by recalcination in air.

SUMMARY OF THE INVENTION

According to a first aspect of the invention there is provided a method for the modification of a natural clinoptilolite to produce a modified clinoptilolite for use in a reaction for the preparation of or transformation of hydrocarbons, which method includes the step of treating the natural clinoptilolite with a suitable mineral acid at a concentration of greater than 1M, for a treatment time longer than 24 hours, and at a suitable treatment temperature, to produce the modified clinoptilolite.

Preferably, the natural clinoptilolite is treated with hydrochloric acid at a concentration of from greater than 1M up to and including 2.5M, more preferably 2M, and at a treatment temperature of from 40° C. to 80° C. inclusive, for a treatment time of from longer than 24 hours up to and including 72 hours.

After the acid treatment step, the modified clinoptilolite is preferably calcined at a suitable calcining temperature of from 450° C. to 550° C. for a suitable calcining time of from 3 hours.

The modified clinoptilolite may be produced starting from a natural clinoptilolite from Zululand, South Africa, or from any other suitable natural clinoptilolite such as that from Futatsui, Japan.

According to another aspect of the invention, there is provided a modified clinoptilolite, modified according to the method set out above, for use in a process for the conversion of methanol and/or dimethyl ether to hydrocarbon reaction products.

According to a further aspect of the invention there is provided a method for the regeneration of a deactivated modified clinoptilolite used in a process for the preparation of or transformation of hydrocarbons, which method includes the step of heating the deactivated modified clinoptilolite at a suitable regeneration temperature and for a suitable regeneration time in the presence of nitrous oxide ($N_2O$) or a mixture of nitrous oxide and a second oxidant such as oxygen or air.

Preferably, the deactivated modified clinoptilolite is treated with the nitrous oxide or a mixture of nitrous oxide and a second oxidant at a regeneration temperature of from 450° C. to 550° C., more preferably 500° C., for a period of 2 to 6 hours or more, preferably approximately 3 hours.

According to a further aspect of the invention there is provided a modified clinoptilolite, modified according to the method set out above, or any other method, for use in a process for the cracking of hydrocarbon products.

DESCRIPTION OF PREFERRED EMBODIMENTS

Figure 1:
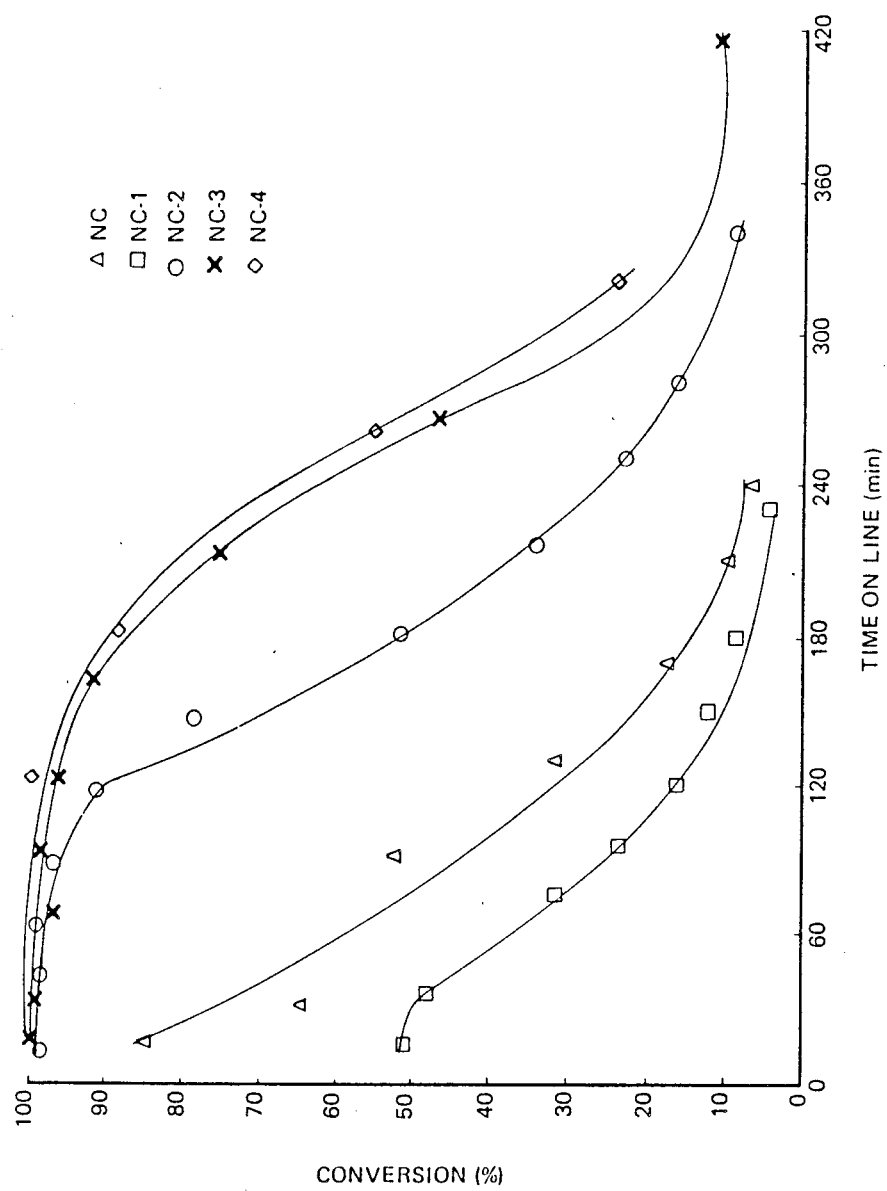

The first aspect of the invention is a method for the modification of a natural clinoptilolite to provide a catalyst which is suitable for use in various reactions. The starting material is any suitable natural clinoptilolite, produced in South Africa or anywhere else in the world. The natural clinoptilolite before modification, is not particularly active. To activate the natural clinoptilolite, it is treated with any suitable mineral acid having a molarity of greater than 1M, preferably from greater than 1M up to and including 2.5M, more preferably 2M, at a suitable treatment temperature of from 40° C. to 80° C., and for a suitable treatment time longer than 24 hours. The preferred mineral acid is hydrochloric acid. These conditions are more severe than the conditions disclosed in the article in Applied Catalysis, 16 (1985) 245-253 and thus result in a more effective modified clinoptilolite. Further, after the acid treatment step, the clinoptilolite is preferably calcined at a suitable calcining temperature, e.g. from 450° C. to 550° C., more preferably 500° C., for a suitable calcining time, e.g. 3 or 4 hours.

Examples of this method are given at the end of this specification.

The modified clinoptilolite may be produced starting from a natural clinoptilolite mined in Zululand, South Africa, or from any other suitable natural clinoptilolite.

It is known that natural clinoptilolite from different locations differ in their properties and thus the modified clinoptilolite produced from natural clinoptilolite from Zululand, South Africa, will have somewhat different properties from the modified clinoptilolite produced from natural clinoptilolite from Futatsui, Japan.

The next aspect of the invention is the use of a modified clinoptilolite, produced by the method described above, in a process for the conversion of methanol or dimethyl ether or a mixture of methanol and dimethyl ether to hydrocarbon reaction products.

This reaction is a well-known reaction and in the present case may be carried out utilising the usual reaction conditions. The reaction may be carried out in a fixed-bed or in a fluidised bed reactor at suitable temperatures and pressures. It has been found that the use of a modified clinoptilolite catalyst gives a hydrocarbon reaction product which is rich in ethene, propene and butene.

Examples of this process are also given at the end of this specification.

The next aspect of the invention is a method for the regeneration of a modified clinoptilolite catalyst which has become deactivated through use in a process for the preparation of or transformation of hydrocarbons. It is well-known that zeolite catalysts deactivate with time, as coke (highly carbonaceous material) deposits on the catalyst. It is believed that the production of methane in the conversion reaction is related to coke formation. Thus, reducing methane formation will increase the lifetime of a catalyst.

The method for the regeneration of the catalyst comprises the step of treating the deactivated catalyst at a suitable regeneration temperature and for a suitable regeneration time with nitrous oxide or a mixture of nitrous oxide and a second oxidant such as oxygen or air. The regeneration may be carried out at a regeneration temperature of from 450° C. to 550° C., more preferably approximately 500° C. for a time period of approximately 3 hours or more. Surprisingly, it has been found that the regeneration of deactivated modified clinoptilolite proceeds far more effectively when nitrous oxide is used over the use of oxygen or air alone.

Examples of this regeneration method are also given at the end of this specification.

The next aspect of the invention is the use of modified clinoptilolite produced according to the method set out above, or any other method, e.g. the method disclosed in Applied Catalysis, 16 (1985) 249-253, as a cracking catalyst, i.e. in a process for the cracking of higher hydrocarbons to lower hydrocarbons.

Cracking processes are well-known and the conditions of use of the modified clinoptilolite are substantially the same as the known conditions of use.

It has been found that higher hydrocarbons such as hexene, heptene, octene and decene may be cracked over a modified clinoptilolite catalyst to produce selectively $C_3$-$C_5$ alkenes. This reaction may be carried out in a fixed catalyst bed or in a fluidised catalyst bed.

Examples of this cracking process using a modified clinoptilolite catalyst, are also given at the end of this specification.

In place of natural clinoptilolite, one may use another natural zeolite having a similar pore size. Natural clinoptilolite has a first pore size of 3.4 by 3.5 Å and a second pore size, which is the important pore size for the present invention, of 3.4 by 7.2 Å. Other suitable natural zeolites include:

| Zeolite | Pore Sizes |
| --- | --- |
| Mordenite | 6,7 by 7,0 Å |
|  | 2,9 by 5,7 Å |
| Stilbite | 4,1 by 6,2 Å |
|  | 2,7 by 5,7 Å |
| Laumontite | 4,6 by 6,3 Å |
| Heulandite | 4,0 by 5,5 Å |
|  | 4,4 by 7,2 Å |
|  | 4,1 by 4,7 Å |

EXAMPLE 1

Comparative Example

A sample of the unmodified naturally occurring zeolite clinoptilolite from Zululand, South Africa, denoted NC, (4 g, particle size 0.5-1.0 mm) and having a surface area (determined by the RET method) of 20.9 m$^2$/g, was utilised as a catalyst for the methanol conversion reaction in a fixed bed downflow glass microreactor. Methanol was reacted over the zeolite at a weight hourly space velocity (WHSV) of 0.097 h$^{-1}$ at 400° C. Products were collected and analysed by standard gas chromatographic techniques. The results, given in Table 1, demonstrate that the unmodified zeolite is a poor catalyst for this reaction and only effects partial methanol conversion.

EXAMPLE 2

Comparative Example

This example demonstrates that calcination of the unmodified zeolite in the absence of acid extraction is not beneficial. A sample of the unmodified zeolite NC was calcined in air (3h, 500° C.) and denoted NC-1. The surface area (determined by the BET method) was 18.8 m$^2$/g. NC-1 was then utilised as a catalyst for methanol conversion as discussed in Example 1 and the results are shown in Table 1. The calcination treatment was found to deactivate the zeolite and hence NC-1 was a poorer catalyst than the unmodified natural zeolite, NC.

EXAMPLE 3

A sample of the unmodified natural clinoptilolite NC was suspended with stirring in a solution of 1M ammonium sulphate at 25° C. for 40 minutes. Following this treatment the sample was collected by filtration and washed with distilled water. This procedure was repeated a total of 4 times. Following the final treatment the sample was dried (120° C., 3 h) in air and then calcined (500° C., 3h) to give a modified zeolite denoted NC-2. The surface area (determined by the BET method) was 65.2 m$^2$/g. NC-2 was then utilised as a catalyst for methanol conversion as described in Example 1 and the results are shown in Table 1. The ammonium ion exchange and calcination procedures improves the catalytic activity and lifetime of the zeolite.

EXAMPLE 4

A sample of unmodified natural clinoptilolite NC (100 g) was suspended with stirring in aqueous hydrochloric acid (1m, 1l) at 74° C. for 8 h. The zeolite was recovered by filtration, washed with distilled water and this procedure was repeated a total of 3 times. After the final treatment the sample was dried (120° C., 3 h) in air and calcined (500° C., 3 h) to give a modified zeolite denoted NC-3. NC-3 was then utilised as a catalyst for methanol conversion as described in Example 1 and the results are shown in Table 1. Acid treatment of the natural clinoptilolite according to this procedure improves the activity and lifetime of the zeolite when compared with samples NC, NC-1 and NC-2.

EXAMPLE 5

A sample of unmodified natural clinoptilolite NC (100 g) was suspended with stirring in aqueous hydrochloric acid (2M, 1l) at 70° C. for 13.3 h. The zeolite was recovered by filtration, washed with distilled water and this procedure was repeated a total of 3 times. After the final treatment the sample was dried (120° C., 3 h) in air and calcined (500° C., 3 h) to give a modified zeolite catalyst NC-4. NC-4 was then utilised as a catalyst for methanol conversion as described in Example 1 and the results are shown in Table 1. 2M acid treatment according to these procedures gives a superior catalytic performance when compared to the performance of the 1M acid treated material, NC-3, and additionally is also superior to the performance of samples NC, NC-1 and NC-2. Treated clinoptilolites all give very high yields of $C_2$–$C_4$ alkenes when tested as catalysts for methanol conversion.

EXAMPLE 6

This example demonstrates the use of a modified clinoptilolite as a hydrocarbon cracking catalyst. Modified clinoptilolite was prepared as described in Example 3 (i.e. ammonium exchange and calcination), sample NC-2, and this zeolite was used as a catalyst for 1-hexene cracking at hexene WHSV 0.2 $h^{-1}$ and at 400° C.; and also at WHSV 0.16 $h^{-1}$ and at 500° C. The results are shown in Table 2. The results demonstrate that the modified zeolite is very active for hydrocarbon cracking.

Additionally, the natural clinoptilolite was modified as described in Example 5 (i.e. treatment with HCl and calcination), sample NC-4, and this zeolite was used as a catalyst for (a) hex-1-ene cracking at WHSV 0.13 $h^{-1}$ and at 500° C.; (b) hept-1-ene at WHSV of 0.2 $h^{-1}$ at 400° C.; (c) oct-1-ene at WHSV of 0.08 $h^{-1}$ at 400° C.; and (d) dec-1-ene at WHSV of 0.06 $h^{-1}$ at 400° C. The results are shown in Tables 3, 4, 5 and 6. The results demonstrate that the modified clinoptilolite is very active for hex-1-ene, hept-1-ene, oct-1-ene and dec-1-ene cracking and the major products observed are $C_3$–$C_5$ alkenes. At 500° C. 60% propene selectivity can be obtained.

EXAMPLE 7

Catalyst Lifetime

The modified zeolites when used as catalysts for methanol conversion or hydrocarbon cracking reactions became deactivated with the deposition of highly carbonaceous material known as coke. This build up of coke occurs at a rate of ca. 0.5 g C/100 g catalyst/h during methanol conversion at 400° C. and WHSV 0.1 $h^{-1}$. The lifetime of the catalysts NC, NC-1, NC-2, NC-3 and NC-4 are shown in a plot of conversion against reaction time for methanol conversion and this is shown in FIG. 1. It is apparent that acid treatment of the zeolite according to the method of the invention considerably improves the operating lifetime of the zeolite.

EXAMPLE 8

Figure 2:
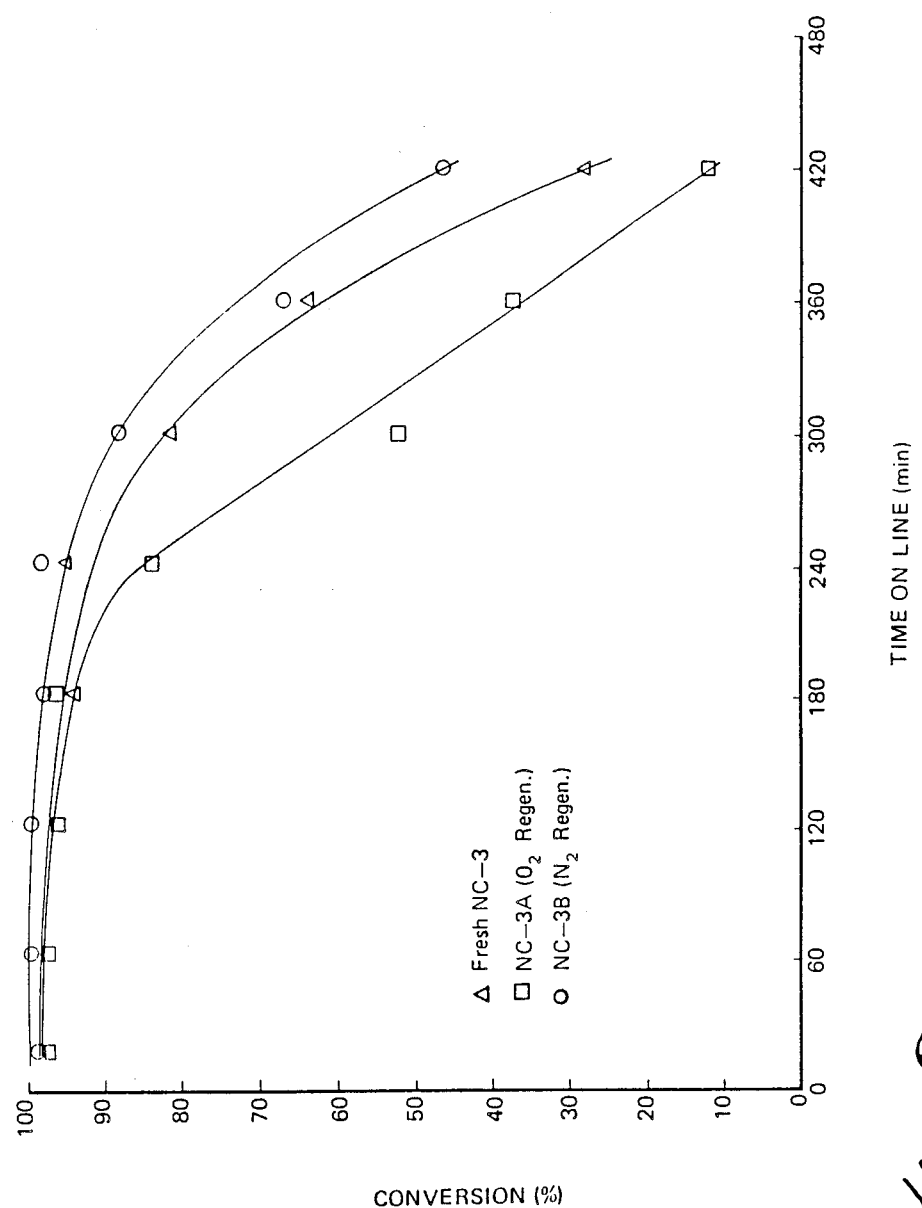

This example demonstrates that the deactivated, i.e. coked, zeolite catalysts described in the previous examples can be successfully reactivated by removing the coke as $CO_2$ and $H_2O$ on oxidation by reaction with $N_2O$ as oxidant, and that surprisingly $N_2O$ is a more effective oxidant than $O_2$. $O_2$ is well-known as an oxidant for zeolite catalyst reactivation in industrial processes. Deactivated samples of catalyst NC-3 (see example 4) were prepared by reaction of NC-3 with methanol as described in Example 1. The deactivated NC-3 was reactivated either using an $N_2O$ treatment (500° C., 3 h, $N_2O$ GHSV=3600 $h^{-1}$) to give sample NC-3B or an $O_2$ treatment (500° C., 3 h, $O_2$ GHSV=3600 $h^{-1}$) to give sample NC-3A. The effectiveness of $N_2O$ verses $O_2$ reactivation is shown by the catalytic activity and lifetime of a catalyst when tested as catalysts for methanol conversion following reactivation, and the results are shown in Table 7 and FIG. 2. The $N_2O$ reactivated zeolite is more active than the $O_2$ reactivated material and furthermore the $N_2O$ reactivated zeolite exhibited a much longer active lifetime.

TABLE 1

| CATALYTIC PERFORMANCE OF MODIFIED CLINOPTILOLITE CATALYST, 400 °C. | | | | | | | | | | |
|---|---|---|---|---|---|---|---|---|---|---|
| CATALYST | NC | | NC-1 | | NC-2 | | NC-3 | | NC-4 | |
| WHSV ($h^{-1}$) | 0.097 | | 0.101 | | 0.083 | | 0.097 | | 0.098 | |
| TOL (min) | 60 | 240 | 75 | 230 | 60 | 250 | 65 | 265 | 60 | 260 |
| CONVERSION (%) | 64.5 | 6.5 | 31.5 | 4.3 | 99.1 | 23.1 | 96.8 | 47.1 | 100 | 55.2 |
| SELECTIVITY (% by mass) | | | | | | | | | | |
| $CH_4$ | 5.8 | 14.4 | 8.7 | 19.2 | 7.5 | 9.8 | 4.3 | 6.8 | 8.9 | 12.8 |
| $C_2H_4$ | 15.8 | 13.1 | 15.9 | 13.4 | 28.3 | 28.6 | 15.7 | 12.3 | 22.1 | 21.5 |
| $C_2H_6$ | 1.8 | 2.3 | 2.3 | 2.9 | 4.0 | 4.4 | 1.1 | 1.0 | 4.1 | 3.1 |
| $C_3H_6$ | 44.4 | 41.1 | 43.1$^a$ | 32.4$^a$ | 35.6$^a$ | 34.9$^a$ | 27.8 | 26.1 | 23.8 | 24.4 |
| $C_3H_8$ | 0 | 0 | — | — | — | — | 4.0 | 2.7 | 7.6 | 2.7 |
| $C_4$ | 19.1 | 14.7 | 17.1 | 12.5 | 16.7 | 15.0 | 13.0 | 20.5 | 17.3 | 16.5 |
| $C_5$ | 10.0 | 11.6 | 9.9 | 13.2 | 6.4 | 5.1 | 23.5 | 22.7 | 9.2 | 9.9 |
| $C_6$ | 2.8 | 2.8 | 3.0 | 6.4 | 1.2 | 2.1 | 9.2 | 7.2 | 6.3 | 7.6 |
| $C_{7+}$ | 0.1 | 0 | 0.1 | 0 | 0.3 | 0 | 1.3 | 0.6 | 0.6 | 1.5 |
| Total $C_2$–$C_4$ | 81.1 | 71.2 | 78.4 | 61.2 | 84.6 | 82.9 | 61.6 | 62.6 | 74.9 | 68.2 |

$^a$Total $C_3$ fraction

TABLE 2

| CATALYTIC PERFORMANCE OF NC-2 FOR HEXENE CRACKING | | | | | | | |
|---|---|---|---|---|---|---|---|
| | Temperature °C. | | | | | | |
| | 400 | | | 500 | | | |
| WHSV ($h^{-1}$) | 0.2 | | | 0.16 | | | |
| TOL (min) | 15 | 100 | 240 | 15 | 100 | 300 | 520 |

TABLE 2-continued
CATALYTIC PERFORMANCE OF NC-2 FOR HEXENE CRACKING

| | Temperature °C. | | | | | | |
|---|---|---|---|---|---|---|---|
| | 400 | | | 500 | | | |
| Conversion (%) | 53.1 | 47.2 | 43.2 | 83.8 | 76.7 | 65.1 | 54.3 |
| Selectivity (%) | | | | | | | |
| $CH_4$ | 0.2 | 0.2 | 0.1 | 1.6 | 0.9 | 0.6 | 0.4 |
| $C_2H_4$ | 3.3 | 2.8 | 2.2 | 13.2 | 8.3 | 4.2 | 3.5 |
| $C_2H_6$ | 0.2 | 0.1 | 0 | 0.8 | 0.5 | 0.3 | 0.2 |
| $C_3H_6$ | 48.3 | 48.2 | 47.6 | 53.6 | 62.0 | 72.4 | 65.0 |
| $C_3H_8$ | 1.9 | 0.8 | 0.6 | 2.7 | 1.9 | 0 | 0 |
| $C_4$ | 19.6 | 17.3 | 14.7 | 19.4 | 16.1 | 11.3 | 9.8 |
| $C_5$ | 11.9 | 10.5 | 8.6 | 5.4 | 5.0 | 1.0 | 4.4 |
| $C_6$ | 14.2 | 19.1 | 25.7 | 2.6 | 4.8 | 9.4 | 15.5 |
| $C_{7+}$ | 0.5 | 1.0 | 0.5 | 0.7 | 0.5 | 0.7 | 1.2 |

TABLE 3
CATALYTIC PERFORMANCE OF NC-4 FOR HEPTENE CRACKING, 400° C.

| Time On Line (min) | 10 | 70 | 140 | 210 | 280 | 340 | 410 | 480 |
|---|---|---|---|---|---|---|---|---|
| Conversion (%) | 91.5 | 84.9 | 79.5 | 76.5 | 75.5 | 74.3 | 73.0 | 71.8 |
| Selectivity (% by mass) | | | | | | | | |
| $CH_4$ | 0.2 | 0.1 | 0.1 | 0.1 | 0.1 | 0.1 | 0.0 | 0.0 |
| $C_2H_4$ | 2.0 | 1.6 | 1.1 | 1.0 | 0.8 | 0.7 | 0.7 | 0.6 |
| $C_2H_6$ | 0.1 | 0.1 | 0.0 | 0.0 | 0.0 | 0.0 | 0.0 | 0.0 |
| $C_3H_6$ | 34.0 | 38.0 | 40.4 | 41.0 | 39.0 | 39.6 | 40.0 | 40.1 |
| $C_3H_8$ | 2.8 | 1.0 | 0.6 | 0.5 | 0.4 | 0.3 | 0.3 | 0.3 |
| $C_4$ | 42.8 | 44.4 | 45.8 | 45.9 | 48.4 | 48.9 | 49.5 | 50.2 |
| $C_5$ | 9.1 | 7.9 | 6.9 | 6.5 | 5.8 | 5.8 | 5.4 | 5.3 |
| $C_6$ | 4.7 | 4.1 | 3.6 | 3.5 | 3.2 | 3.2 | 3.1 | 2.7 |
| $C_7$* | 0.9 | 0.7 | 0.4 | 0.4 | 0.4 | 0.4 | 0.4 | 0.1 |
| $C_8$ | 2.1 | 1.1 | 0.4 | 0.7 | 0.8 | 0.6 | 0.6 | 0.4 |
| $C_{9+}$ | 1.3 | 1.0 | 0.5 | 0.4 | 1.1 | 0.3 | 0.3 | 0.3 |

*Isomerisation Products

TABLE 4
CATALYTIC PERFORMANCE OF NC-4 FOR OCTENE CRACKING, 400°C.

| Time On Line (min) | 20 | 90 | 155 | 225 | 325 |
|---|---|---|---|---|---|
| Conversion (%) | 90.8 | 86.4 | 80.2 | 75.0 | 44.7 |
| Selectivity (% by mass) | | | | | |
| $CH_4$ | 0.1 | 0.1 | 0.1 | 0.1 | 0.1 |
| $C_2H_4$ | 2.1 | 1.8 | 1.5 | 1.4 | 1.2 |
| $C_2H_6$ | 0.1 | 0.1 | 0.0 | 0.0 | 0.1 |
| $C_3H_6$ | 19.4 | 19.0 | 18.7 | 18.8 | 18.4 |
| $C_3H_8$ | 1.2 | 0.6 | 0.4 | 0.3 | 0.4 |
| $C_4$ | 50.0 | 50.4 | 50.5 | 50.7 | 48.2 |
| $C_5$ | 22.9 | 24.2 | 25.4 | 26.3 | 27.4 |
| $C_6$ | 2.1 | 1.8 | 1.6 | 1.5 | 1.8 |
| $C_7$ | 0.4 | 0.4 | 0.5 | 0.5 | 1.2 |
| $C_{9+}$ | 1.6 | 1.5 | 1.3 | 0.4 | 1.0 |

TABLE 5
CATALYTIC PERFORMANCE OF NC-4 FOR DECENE CRACKING, 400° C.

| Time On Line (min) | 15 | 95 | 175 | 330 | 410 | 560 | 640 | 720 | 800 |
|---|---|---|---|---|---|---|---|---|---|
| Conversion (%) | 99.5 | 99.7 | 99.8 | 99.0 | 95.6 | 85.8 | 84.6 | 81.2 | 78.2 |
| Selectivity (% by mass) | | | | | | | | | |
| $CH_4$ | 0.2 | 0.1 | 0.1 | 0.1 | 0.1 | 0.1 | 0.1 | 0.1 | 0.1 |
| $C_2H_4$ | 2.4 | 1.8 | 1.4 | 1.0 | 1.0 | 0.8 | 0.9 | 0.9 | 0.8 |
| $C_2H_6$ | 0.1 | 0.1 | 0.0 | 0.0 | 0.0 | 0.0 | 0.0 | 0.0 | 0.0 |
| $C_3H_6$ | 20.2 | 18.1 | 16.8 | 15.3 | 14.6 | 13.1 | 12.8 | 12.4 | 12.2 |
| $C_3H_8$ | 1.5 | 0.4 | 0.3 | 0.2 | 0.1 | 0.1 | 0.1 | 0.1 | 0.1 |
| $C_4$ | 42.6 | 45.1 | 43.3 | 38.0 | 33.6 | 27.3 | 25.8 | 23.6 | 22.8 |
| $C_5$ | 19.8 | 22.4 | 22.8 | 22.7 | 23.0 | 28.8 | 30.2 | 31.4 | 32.6 |
| $C_6$ | 7.1 | 1.5 | 1.4 | 3.5 | 8.1 | 14.5 | 16.6 | 21.0 | 22.7 |
| $C_7$ | 1.6 | 1.3 | 2.4 | 3.2 | 4.2 | 4.2 | 4.4 | 5.3 | 5.2 |
| $C_8$ | 4.2 | 6.9 | 11.4 | 15.7 | 14.8 | 10.6 | 8.2 | 4.2 | 2.4 |
| $C_{9+}$ | 0.2 | 0.2 | 0.1 | 0.4 | 0.5 | 0.5 | 0.9 | 0.9 | 0.9 |

TABLE 6
CATALYTIC PERFORMANCE OF NC-4 FOR HEXENE CRACKING, 500° C.

| Time On Line (min) | 15 | 60 | 120 | 180 | 240 | 300 | 360 | 420 |
|---|---|---|---|---|---|---|---|---|
| Conversion (%) | 84.6 | 71.4 | 66.7 | 59.2 | 56.4 | 51.1 | 47.2 | 45.0 |
| Selectivity (% by mass) | | | | | | | | |
| $CH_4$ | 1.1 | 1.0 | 0.7 | 0.4 | 0.5 | 0.5 | 0.4 | 0.4 |
| $C_2H_4$ | 7.8 | 6.9 | 5.3 | 4.0 | 4.0 | 3.6 | 3.2 | 2.9 |
| $C_2H_6$ | 0.5 | 0.5 | 0.4 | 0.2 | 0.3 | 0.3 | 0.2 | 0.2 |
| $C_3H_6$ | 64.2 | 70.7 | 65.4 | 62.8 | 63.3 | 60.5 | 57.7 | 56.5 |

TABLE 6-continued

| CATALYTIC PERFORMANCE OF NC-4 FOR HEXENE CRACKING, 500° C. | | | | | | | | |
|---|---|---|---|---|---|---|---|---|
| $C_3H_8$ | 4.0 | 2.7 | 1.7 | 1.1 | 1.0 | 0.8 | 0.6 | 0.5 |
| $C_4$ | 13.5 | 11.9 | 10.4 | 10.2 | 9.6 | 9.3 | 9.1 | 9.0 |
| $C_5$ | 4.8 | 4.6 | 4.7 | 5.0 | 4.6 | 4.7 | 4.8 | 4.8 |
| $C_6$ | 3.3 | 0.4 | 10.1 | 15.5 | 15.5 | 19.2 | 22.6 | 24.7 |
| $C_{7+}$ | 0.9 | 1.2 | 1.3 | 0.9 | 1.1 | 1.2 | 1.2 | 1.1 |

TABLE 7

CATALYTIC PERFORMANCE OF THE FRESH AND REACTIVATED NC-3 CATALYST

| | CATALYST | | | | | | | | |
|---|---|---|---|---|---|---|---|---|---|
| | NC-3 | | | NC-3A | | | NC-3B | | |
| TOL (min) | 120 | 240 | 360 | 120 | 240 | 360 | 120 | 240 | 360 |
| Conversion (%) | 96.5 | 95.1 | 63.7 | 96.3 | 83.9 | 35.4 | 99.4 | 98.4 | 66.9 |
| Selectivity (% by mass) | | | | | | | | | |
| $CH_4$ | 9.5 | 10.1 | 10.8 | 7.0 | 8.6 | 15.3 | 8.8 | 6.7 | 10.0 |
| $C_2H_4$ | 21.0 | 20.0 | 19.8 | 19.1 | 18.5 | 21.4 | 21.4 | 17.0 | 21.0 |
| $C_2H_5$ | 2.5 | 2.1 | 1.7 | 1.6 | 1.7 | 2.1 | 2.2 | 1.2 | 2.0 |
| $C_3H_6$ | 27.4 | 24.3 | 28.0 | 29.5 | 30.2 | 27.6 | 25.1 | 27.5 | 29.4 |
| $C_3H_8$ | 5.2 | 4.4 | 3.6 | 4.7 | 4.0 | 2.4 | 5.2 | 3.9 | 3.9 |
| $C_3$ total | 32.5 | 28.7 | 31.6 | 34.2 | 34.2 | 30.0 | 30.3 | 31.4 | 33.3 |
| $C_4$ | 20.5 | 22.0 | 19.4 | 21.6 | 19.7 | 15.5 | 22.8 | 24.7 | 18.3 |
| $C_5$ | 9.9 | 13.0 | 10.0 | 13.9 | 13.3 | 9.7 | 12.6 | 14.2 | 11.2 |
| $C_6$ | 2.7 | 3.4 | 5.5 | 2.2 | 3.2 | 4.6 | 1.3 | 4.0 | 3.1 |
| $C_{7+}$ | 1.2 | 0.6 | 1.1 | 0.4 | 0.6 | 1.3 | 0.6 | 0.7 | 0.9 |

We claim:

1. A method for the modification of a natural clinoptilolite to produce a modified clinoptilolite for use in a reaction for the preparation of or transformation of hydrocarbons, the method including the step of treating the natural clinoptilolite with a suitable mineral acid at a concentration of greater than 1M for a treatment time of longer than 24 hours and at a suitable treatment temperature to produce the modified clinoptilolite.

2. A method according to claim 1 wherein the suitable mineral acid is hydrochloric acid.

3. A method according to claim 1 wherein the suitable mineral acid has a concentration of from greater than 1M up to and including 2.5M.

4. A method according to claim 1 wherein the suitable mineral acid is 2M hydrochloric acid.

5. A method according to claim 1 wherein the treatment time is from longer than 24 hours up to and including 72 hours.

6. A method according to claim 1 wherein the treatment temperature is from 40° C. to 80° C.

7. A method according to claim 1 wherein after the acid treatment step the modified clinoptilolite is calcined.

8. A method according to claim 7 wherein the calcining is carried out at a calcining temperature of from 450° C. to 550° C. for a calcining time of from 3 hours.